(12) United States Patent
Baldas et al.

(10) Patent No.: US 6,196,605 B1
(45) Date of Patent: Mar. 6, 2001

(54) PORTABLE STORAGE APPARATUS FOR MOTOR VEHICLE

(75) Inventors: Jason Paul Baldas, Warren; Hitoshi Ohashi, West Bloomfield; Gerald Oscar Morrison, Beverly Hills; Eileen Marie Avram, Canton, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/475,827

(22) Filed: Dec. 30, 1999

(51) Int. Cl.$^7$ ....................................................... B60R 7/04
(52) U.S. Cl. ........................ 296/37.13; 296/153; 224/543; 224/547
(58) Field of Search ................................... 296/152, 153, 296/37.8, 37.9, 37.13, 37.15; 224/539, 543, 545, 547

(56) References Cited

U.S. PATENT DOCUMENTS

| | | | |
|---|---|---|---|
| 1,642,161 | * 9/1927 | Lester | 224/547 |
| 1,694,855 | * 12/1928 | Irons | 296/152 X |
| 1,860,224 | * 5/1932 | Bode | 296/37.13 X |
| 2,934,374 | * 4/1960 | Mortenson et al. | 296/37.16 |
| 3,089,597 | * 5/1963 | Kaplan | 224/547 |
| 3,125,212 | * 3/1964 | Gerber | 224/547 |
| 4,376,502 | * 3/1983 | Cohen | 224/547 |
| 4,453,760 | * 6/1984 | Hira | 296/153 X |
| 4,522,442 | 6/1985 | Takenaka . | |
| 5,072,983 | * 12/1991 | Muroi et al. | 296/37.13 |
| 5,372,289 | 12/1994 | Dachicourt . | |
| 5,800,004 | * 9/1998 | Ackert | 296/37.13 |
| 5,915,777 | * 6/1999 | Gignac et al. | 296/37.16 |
| 5,951,085 | * 9/1999 | Fukatsu | 296/37.8 |

* cited by examiner

Primary Examiner—Joseph D. Pape
(74) Attorney, Agent, or Firm—MacMillan, Sobanski & Todd, LLC

(57) ABSTRACT

A portable storage apparatus for use with motor vehicles comprises a support extending outwardly from an interior panel of a motor vehicle. The support includes an inner support member, an outer support member, and opposing side support members. The side support members extend outwardly with respect to the inner support member and support the outer support member in a spaced relation relative to the inner support member. A portable storage bin includes a storage container and a lid. The storage container includes an inner wall, an outer wall, opposing side walls, and a bottom. The walls cooperatively form a peripheral wall. The bottom is joined to the peripheral wall. The storage container is adapted to be inserted into the support. The lid is pivoted to the storage container so as to be displaceable between an opened position and a closed position.

20 Claims, 7 Drawing Sheets

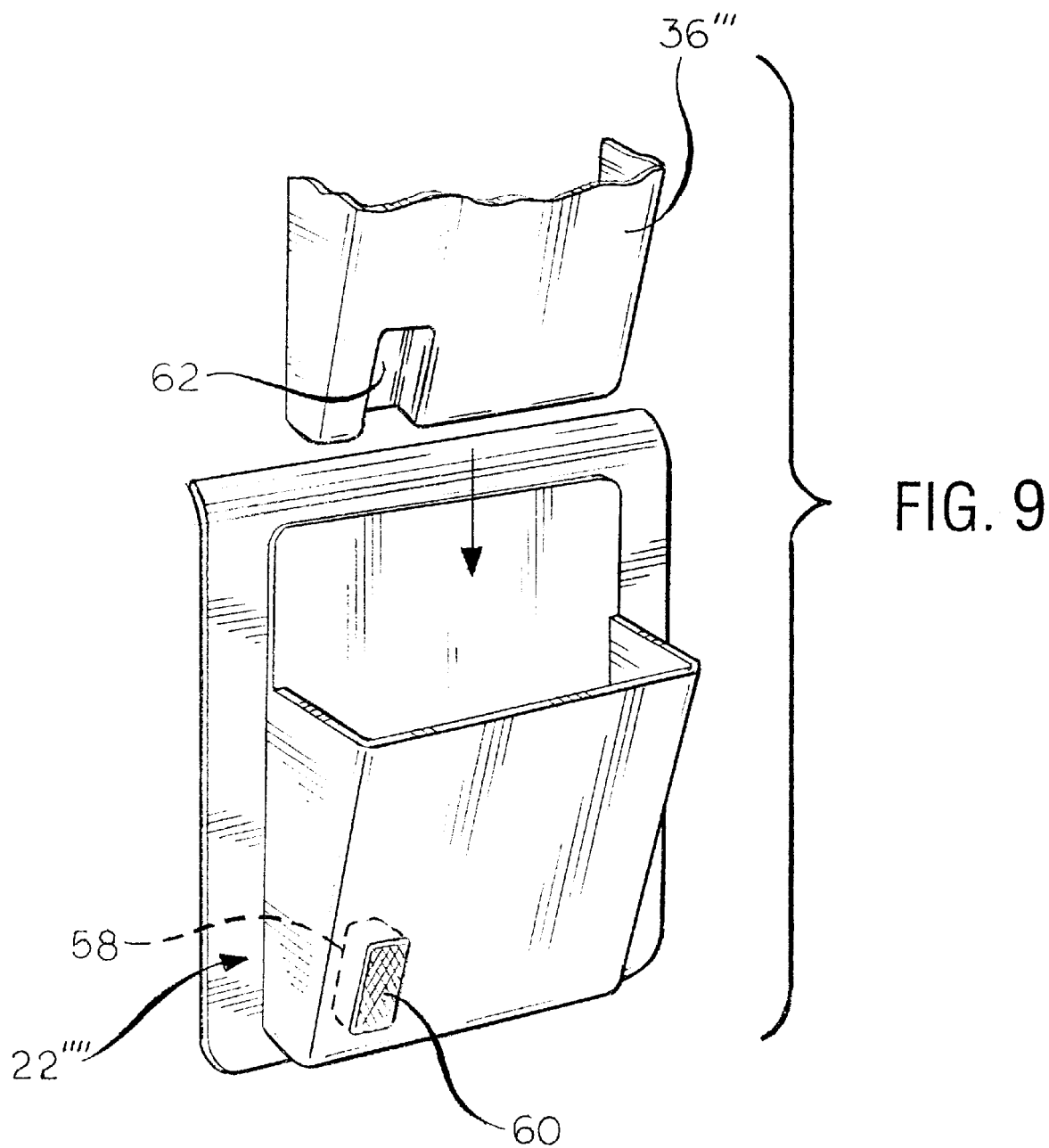

PORTABLE STORAGE APPARATUS FOR MOTOR VEHICLE

BACKGROUND

The present invention is related in general to motor vehicles and more particularly to a portable motor vehicle storage apparatus that is an integral part of an interior panel of motor vehicles.

Motor vehicles include cargo areas and trunk compartments for transporting and storing cargo. Cargo areas and trunk compartments are generally defined by a load surface extending between the motor vehicle side panels and rear seat and rear end of motor vehicles. Cargo transported and stored on the load surface is typically free to move about the load surface due to motion of the motor vehicle induced by accelerating, braking, and turning.

It is important to prevent cargo from shifting about the load surface to prevent the cargo from spilling or being damaged, and further to prevent the cargo from migrating deep within the cargo area or trunk compartment, where an individual may have to bend and stretch to recover it.

Of recent popularity are cargo nets which are formed from flexible elastic cords that may be fastened about cargo to secure the cargo in place. Such nets fail to provide a rigid structure for securing fragile cargo. Moreover, installation of such nets may require an individual to bend and stretch awkwardly into the cargo area or trunk compartment.

Various organizing arrangements have been proposed for use in motor vehicle cargo area and trunk compartments. Such arrangements include partitions and racks that divide the cargo area or trunk compartment into a plurality of discrete storage areas. Some arrangements include partitions that are collapsible and removable to allow the arrangements to be folded and stored in a compact form. These arrangements are generally expensive to manufacture and are cumbersome to assemble. Moreover, such arrangements themselves may fail to remain in a fixed position.

None of the foregoing inventions provide a storage compartment that is adapted to be removably inserted into a support that is an integral part of the motor vehicle interior. A portable storage compartment is needed which may be used to transport items to and from a motor vehicle and which may be supported in the motor vehicle in a substantially fixed position, even throughout the operation of the motor vehicle.

SUMMARY

The invention is directed towards a portable storage apparatus for use with motor vehicles. The apparatus comprises a support extending outwardly from an interior panel of a motor vehicle. The support includes an inner support member, an outer support member, and opposing side support members. The side support members extend outwardly with respect to the inner support member and support the outer support member in a spaced relation relative to the inner support member. A portable storage bin includes a storage container and a lid. The storage container includes an inner wall, an outer wall, opposing side walls, and a bottom. The walls cooperatively form a peripheral wall. The bottom is joined to the peripheral wall. The storage container is adapted to be inserted into the support. The lid is pivoted to the storage container so as to be displaceable between an opened position and a closed position.

Various objects and advantages of this invention will become apparent to those skilled in the art from the following detailed description of the preferred embodiment, when read in light of the accompanying drawings.

BRIEF DESCRIPTION OF THE DRAWINGS

FIG. 9 is a partial exploded perspective view of yet another alternative storage apparatus.

DESCRIPTION

Figure 1:
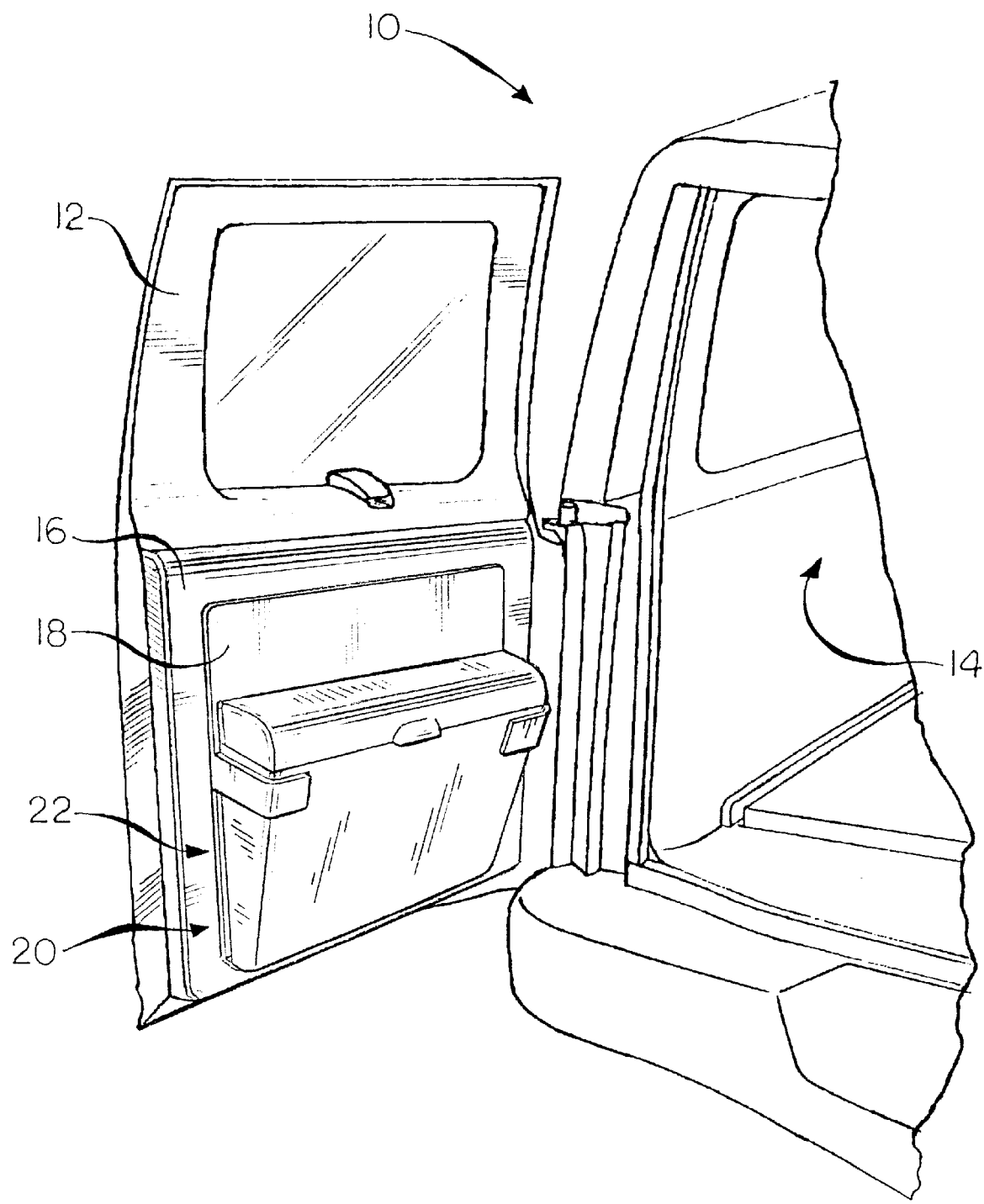
FIG. 1 is a partial perspective view of a motor vehicle and a portable storage apparatus according to the invention.

Now with reference to the drawings, there is illustrated in FIG. 1 a motor vehicle 10 having a door 12 opened to provide access to the motor vehicle interior, generally indicated at 14. The rear door 12 is formed from a metal inner structure having a metal outer skin. An interior panel 16 is attached to the inner structure of the rear door 12. The interior panel 16 may be attached in a conventional manner. For example, holes (not shown) may be provided in the interior panel 16 which are adapted to align with holes (not shown) in the inner structure. Fasteners (also not shown), such as cosmetic screws, may be threaded through the aligned holes.

The interior panel 16 includes an upper portion 18 and a lower portion, generally indicated at 20. The upper portion 18 of the interior panel 16 preferably has a substantially nominal thickness. That is to say, the upper portion 18 preferably conforms closely to the inner structure of the rear door 12. The lower portion 20 defines a support 22 which extends outwardly relative to the upper portion 18. It should be appreciated that the lower portion 20, or at least a portion thereof, may be recessed in the rear door 12 so that the support 22 is flush with the upper portion 18.

Figure 2:
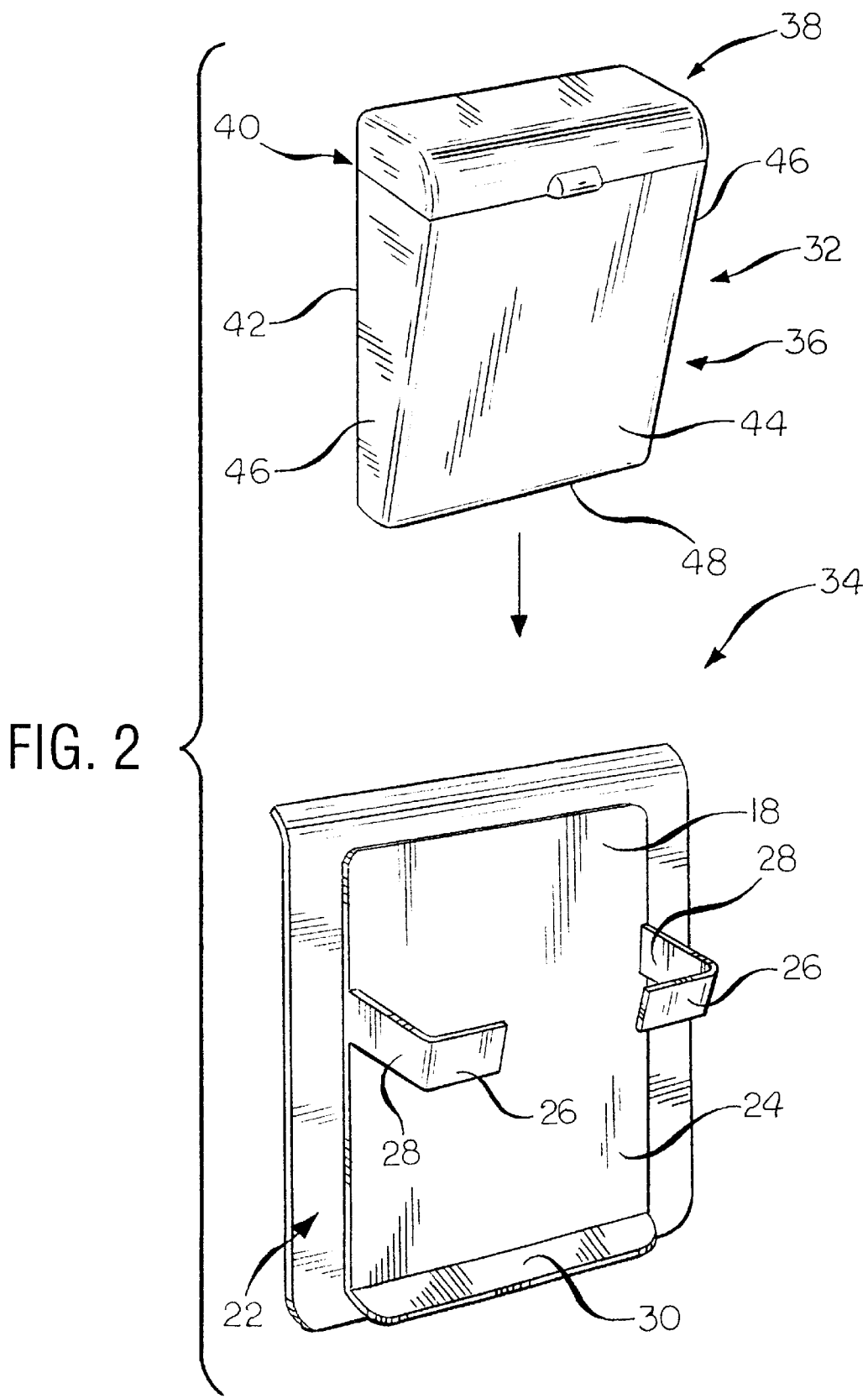
FIG. 2 is an exploded perspective view of the portable storage apparatus shown in FIG. 1.
Figure 3:
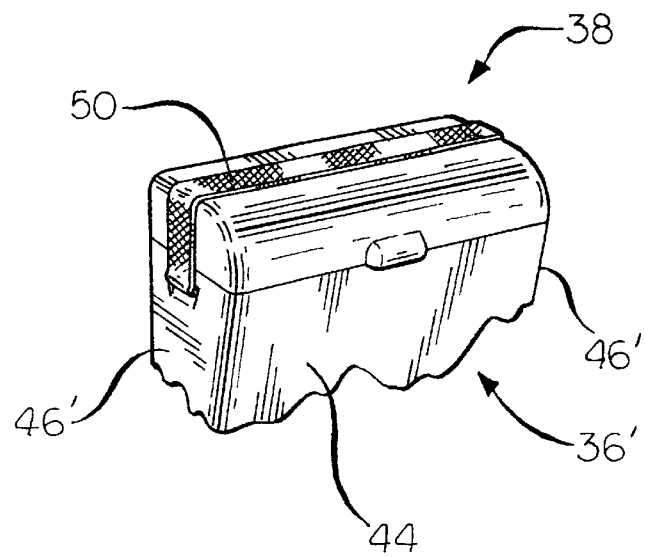
FIG. 3 is a partial perspective view of a storage container according to the invention with a handhold attached thereto.

The support 22 preferably includes inner and outer support members 24, 26 and opposing side support members 28, as shown in FIG. 2. An inner support member 24 is preferably substantially coplanar and coexistent, or integral, with the upper portion 18. Side support members 28 extend outwardly from the inner support member 24. The side support members 28 support one or more outer support members 26 in a spaced relation relative to the inner support member 24.

The side support members 28 are in the form of longitudinally spaced tabs. Outer support members 26 are in the form of hooks or fingers that extend longitudinally towards one another from the side support members 28. The interior panel 16 may include a bottom support member 30, such as the lip shown, which is spaced below the side support members 28. The inner support member 24 cooperates with the outer and side support members 26, 28 and the bottom support member 30 to form the support 22.

The support 22 in combination with a portable storage bin 32 form a motor vehicle storage apparatus 34. The portable storage bin 32 includes a storage container 36 and a lid 38 pivoted to the storage container 36. The storage bin 32 is preferably formed from plastic. The lid 38 may be pivoted to the storage container 36 by a hinge 40. The hinge 40 may be a separate element. Alternatively, the hinge 40 may be a living hinge which is integral with the storage container 36 and the lid 38.

The storage container 36 preferably includes an inner wall 42, an outer wall 44, opposing side walls 46, and a bottom 48. The walls 42, 44, 46 cooperatively form a peripheral wall. The bottom 48 is joined to the peripheral wall. The storage container 36 is adapted to be inserted into the support 22. It is most preferable that the storage container 36 be shaped and dimensioned so that the storage container 36 has a shape which is complementary to that of the support 22. In this way, the storage container 36 will fit snugly in the support 22.

The lid 38 is displaceable between an opened position and a closed position. In the opened position (shown in FIG. 2), items may be inserted into and removed from the storage container 36. In the closed position (shown in FIG. 1), items in the storage container 36 may be retained in the storage container 36.

It is preferable that the storage container 36 have a volume sufficiently large enough to receive items of substantial size. For example, a storage container 36 having a volume in the range of ⅛ to ⅜ cubic feet would be sufficiently large enough to receive sundry items, such as travel aids, articles of clothing, and the like.

In operation, items retained in the storage container 36 may be transported to and from the motor vehicle 10. The storage container 36 may be inserted into the support 22, as shown in FIG. 1. This permits items to be stored in the motor vehicle 10 and transported in the storage bin 32 throughout the operation of the motor vehicle 10. It is preferred that the storage bin 32 be formed from plastic so that wet or damp items may be transported and stored therein. The storage bin 32 may be removed from the support 22 simply by lifting the storage bin 32 from the support 22.

To aid in removing the storage bin 32 from the support 22 and transporting the storage bin 32, a handhold 50 may be attached to the storage bin 32. The handhold 50 may be in the form of a strap or other suitable element which may be attached to the storage bin 32 or formed as an integral part of the storage bin 32. For example, the handhold 50 may be in the form of an elastic strap having opposing ends attached to the opposing side walls 46' of the storage container 36'. An intermediate portion of the handhold 50 may extend up over the lid 38. The handhold 50 may be grasped when lifting and carrying the handhold 50. When not being grasped, the handhold 50 may retract tightly against the lid 38 to hold the lid 38 in a closed position. To open the lid 38, the handhold 50 may be pull towards the outer wall 44 of the storage container 36', out of the way of the lid 38.

Figure 4:
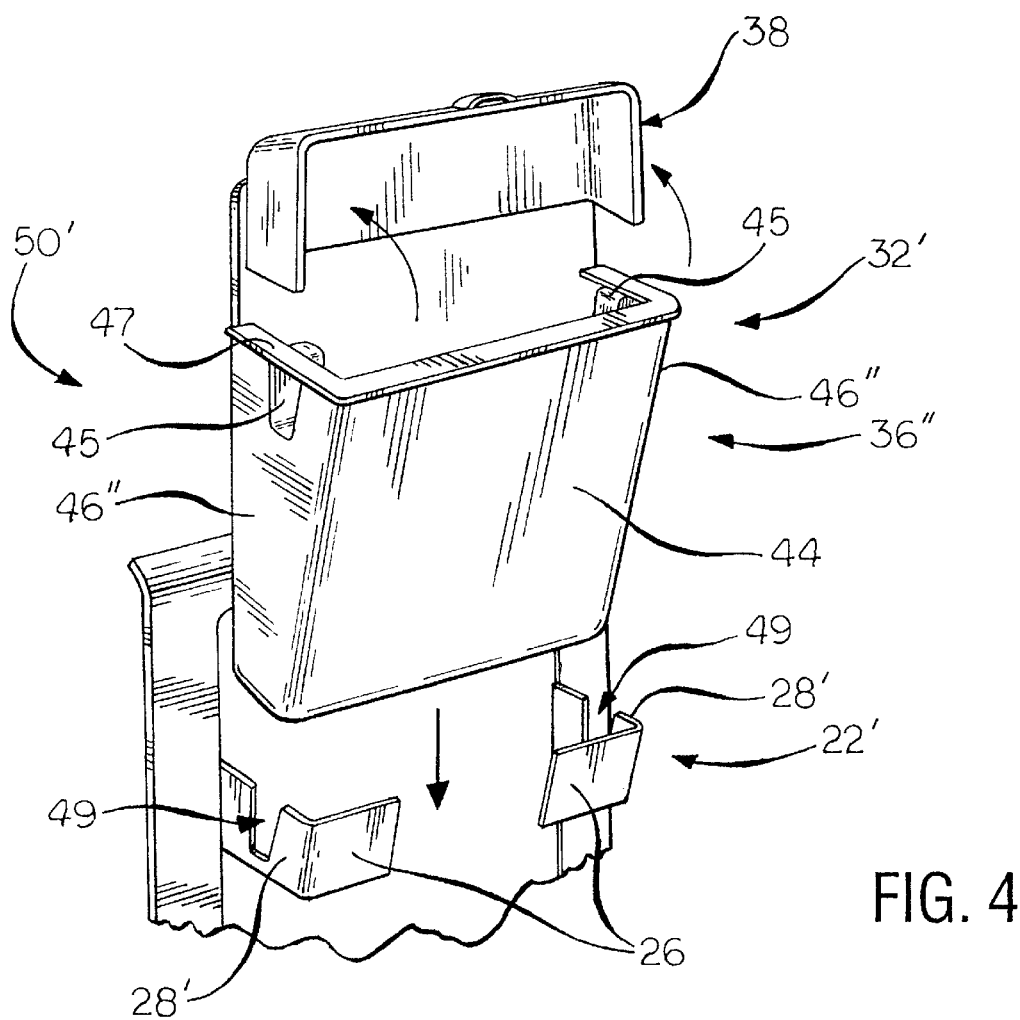
FIG. 4 is a partial perspective view of a portable storage apparatus according to the invention with another handhold attached thereto.

An alternative handhold 50' is shown in FIG. 4. This handhold 50' is comprised of a recess 45 in an upper end of each opposing side wall 46" of the storage container 36". An outwardly extending flange or lip 47 is preferably provided at an upper end of the outer and side walls 44, 46" of the storage container 36". The lip 47 is engageable with the upper ends of the outer and side support members 26, 28" upon inserting the storage container 36" into the support 22'. When the storage container 36" is in the support 22', the recesses 45 align with openings or cutouts 49 in the upper ends of side support members 28". To lift the storage bin 32', the fingers of a user (not shown) may be inserted into the cutouts 49 and further into the recesses 45. The the storage container 36" may be lifted out of the support 22' by applying an upward force against the bottom of the lip 47.

Figure 5:
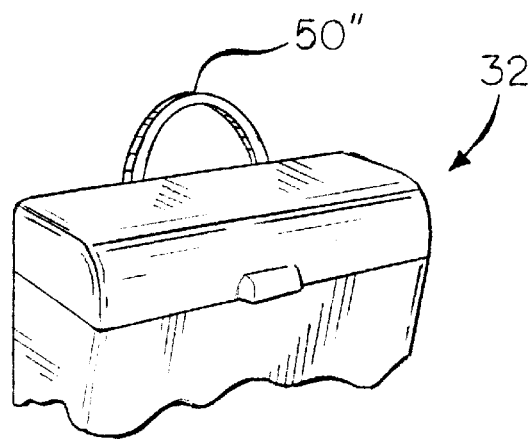
FIG. 5 is a partial exploded perspective view of the portable storage container according to the invention with yet another handhold attached thereto.

Another handhold 50" is shown in FIG. 5. This handhold 50" is preferably formed of a material which is less resilient than the elastic strap set forth above. This handhold 50" may be substantially fixed relative to the storage bin 32. Alternatively, this handhold 50" may pivot relative to the storage bin 32 so that the handhold 50" may be folded against the storage bin 32 or otherwise displaced out of the way.

Figure 6:
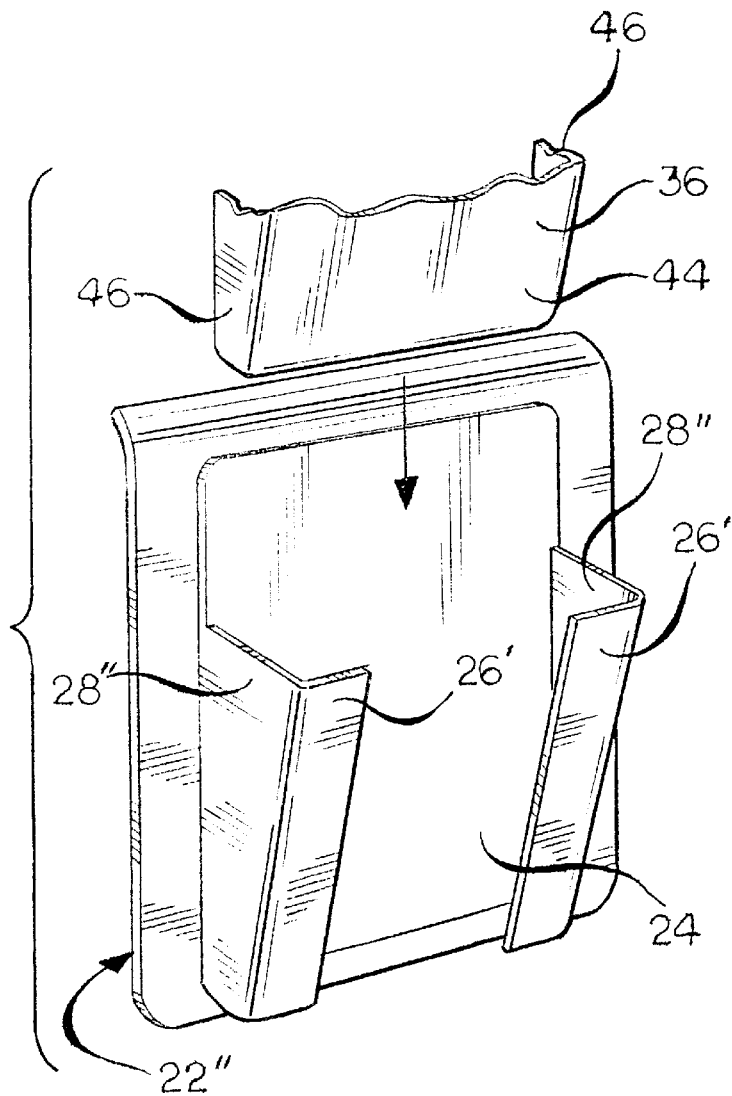
FIG. 6 is a partial exploded perspective view of an alternative storage apparatus.

An alternative support 22" is shown in FIG. 6, this support 22" includes opposing side support members 28" in the form of longitudinally spaced walls. These side support members 28" taper from an upper end to a lower end thereof. Outer support members 26' in the form of flanges or lips extend longitudinally towards one another from the side support members 28". The inner support member 24 cooperates with the outer and side support members 26', 28".

The storage container 36 is shaped to fit the support 22". That is to say, the side walls 46 of the storage container 36 taper from their upper end to their lower end, just as the side members 28" of the support 22". In this way, the storage container 36 may slide into the support 22" until the outer wall 44 of the storage container 36 abuts the outer support members 26' of the support 22". When the outer wall 44 of the storage container 36 abuts the outer support members 26' of the support 22", the storage container 36 ceases to slide any further. The storage container 36 may be removed from the support 22" by lifting the storage container 36 upward out of engagement with the support 22".

Figure 7:
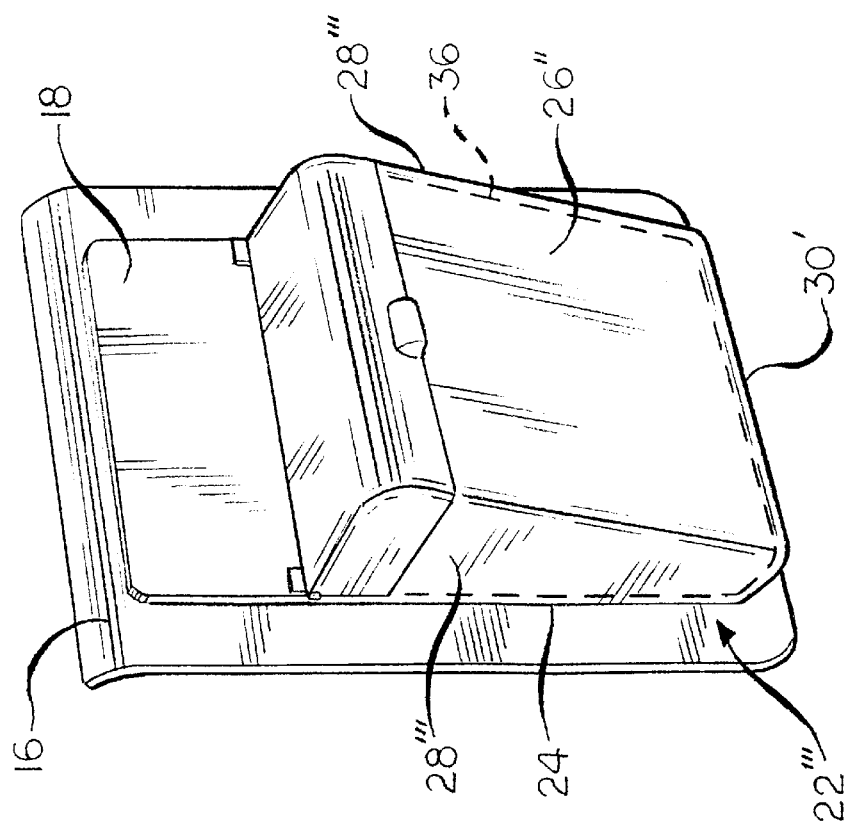
FIG. 7 is a perspective view of another storage apparatus according to the invention.

Another support 22''' is shown in FIG. 7. This support 22''' includes an inner support member 24 in the form of a wall which is preferably substantially coplanar and integral with the upper portion 18 of the interior panel 16. An outer support member 26" is in the form of a wall which is laterally space from the inner support member 24. Side support members 28''' are in the form of walls which extend between the inner and outer support members 24, 26" to triangulate a peripheral wall. A lower support member 30' is in the form of a bottom which extends between inner and outer support members 24, 26" and the side support members 28'''. The bottom cooperates with the peripheral wall to form a pocket for receiving the storage container 36.

Figure 8:
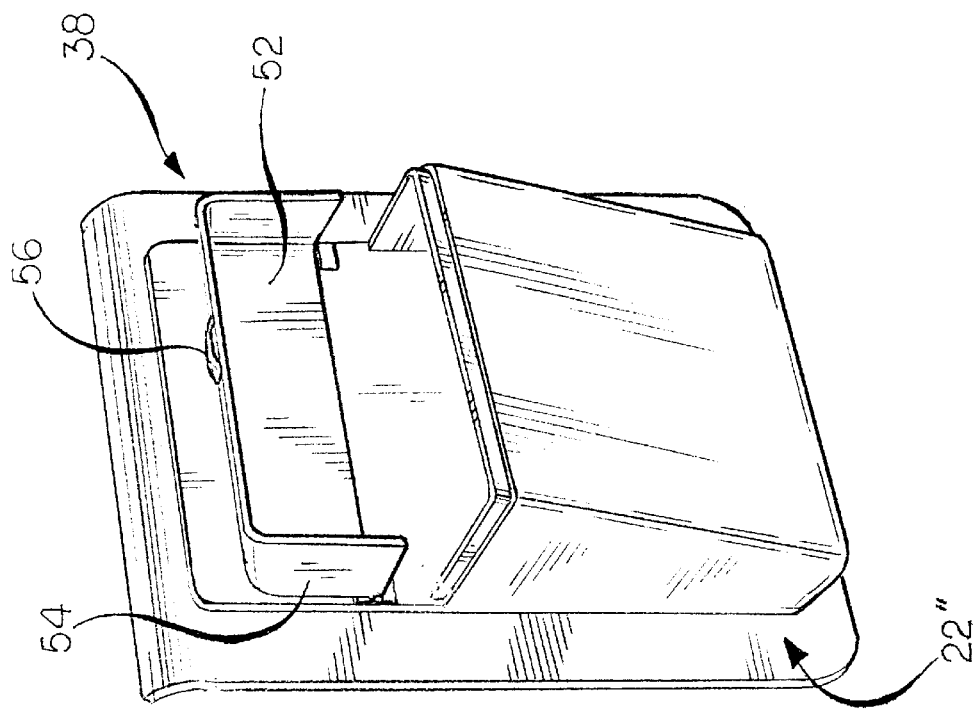
FIG. 8 is a partial perspective view of the storage bin shown in FIG. 7 with a lid thereof in an opened position.

The storage container 36, or at least a portion thereof, is preferably shaped and dimensioned to fit snugly within the support 22'''. A portion of the storage container 36 need not fit snugly in the support 22'''. For example, as shown in FIG. 8, the lid 38 may be provided with a top 52 and a peripheral wall 54 extending down from the top 52. The top 52 may be pivoted to the inner wall 42 of the storage container 36. A forward portion of the peripheral wall 54 may be provided with a handle 56 which may be lifted to open the lid 38. In this way, the lid 38 may be easily opened without interference from the support 22".

As shown in the drawings, the inner and outer support members, the side support members, and the lower support members may be integrally formed. It is preferred that the intersection between the support members be gradual, as shown in the drawings, so that no sharp corners are presented. Such a configuration may be more amenable to the insertion and removal of the storage container into and from the support. Such an interior panel will also be aesthetically pleasing. Moreover, the avoidance of sharp corners may also reduce the risk of injury to the motor vehicle operator or passengers entering and exiting the motor vehicle.

The interior panels described above are preferably molded from plastic. It is most preferred that the interior panels be injection molded so that the interior panels may be efficiently constructed on a mass scale. Plastic material is most preferred because it may be readily matched in color and texture to the storage container for use therewith.

The interior panels described above may further support auxiliary components, such as reflectors and light assemblies, in addition to the supports described above. Hence, it may be desirable for the supports and the storage bin to accommodate such components. That is to say, the supports and the storage bin may be provided with recesses, openings, and the like. For example, a support 22"" may be provided with a recess or opening 58 for receiving and supporting therein a light assembly 60, as shown in FIG. 9. A storage container 36''' likewise may be provided with a recess or a cutout 62 that provides clearance for the light assembly 60 when inserting the storage container 36''' in the support 22"".

It should be noted that the storage container may be supported in a support of the invention by its own weight. That is to say, any one of the above-described supports may receive the storage container through an upper end of the support and the force of gravity will hold the storage container in place. It should also be noted that any of the above-described supports and storage containers may be shaped so as to taper from an upper end to a lower end thereof. In this arrangement, the storage container will frictionally engage the support when the storage container fully abuts the inner and outer support members of the support.

Figure 10:
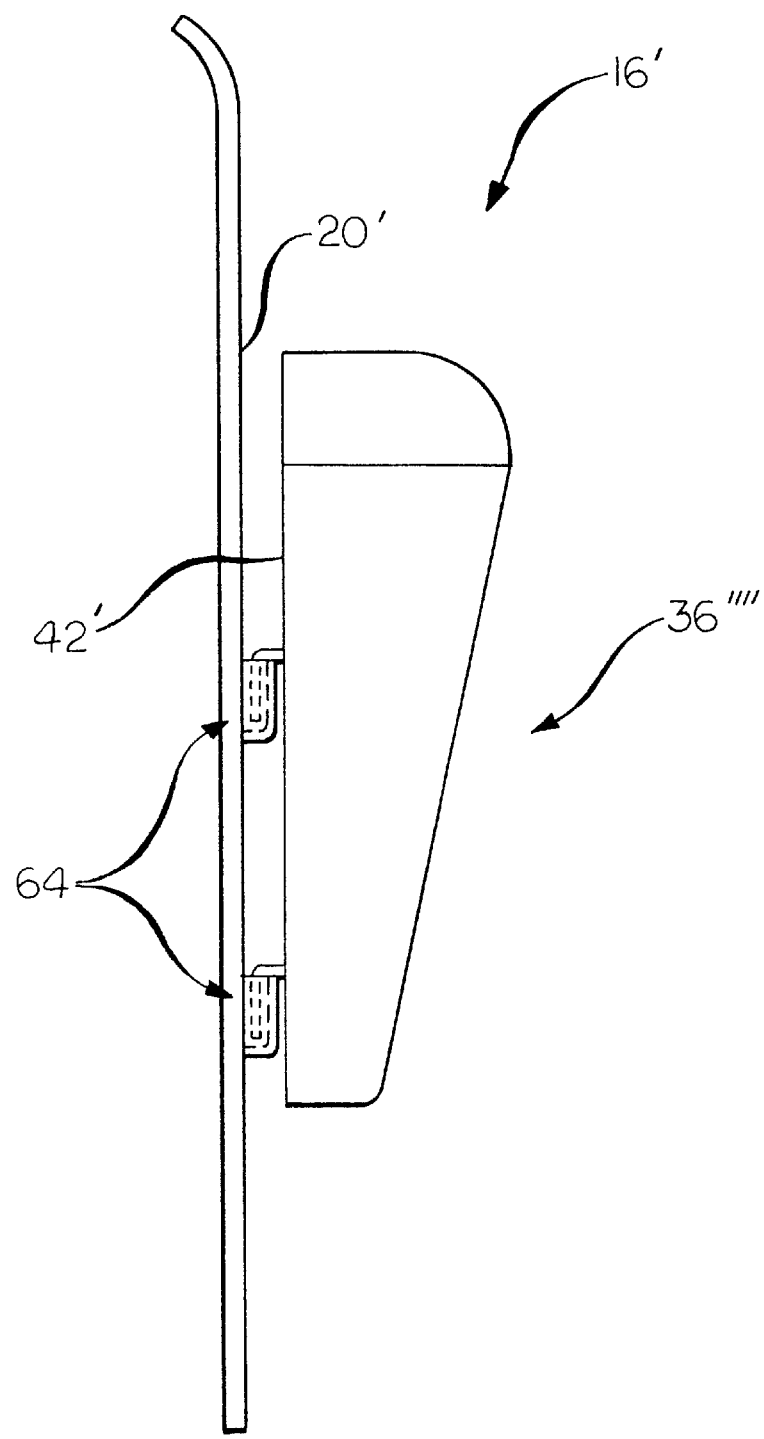
FIG. 10 is a side elevational view of still another alternative storage apparatus.

It should be appreciated that other supports may be used in cooperation with storage container 36"" according to the invention. One such support is shown in FIG. 10. This support is in the form of one or more interlocking hooks 64 extending from the lower portion 20' of the interior panel 16' and the inner wall 42' of the storage container 36'''. The storage container 36"" may be disengaged from the lower portion 20' of the interior panel 16' by lifting or raising the storage container 36"".

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A storage apparatus for use with a motor vehicle, said apparatus comprising:
    an interior panel having a support attached to said panel; said support including an inner support member, an outer support member, and opposing side support members, said side support members extending outwardly with respect to said inner support member and supporting said outer support member in a spaced relation relative to said inner support member; and
    a portable storage bin including a storage container and a lid, said storage container including an inner wall, an outer wall, opposing side walls, and a bottom, said walls cooperatively forming a peripheral wall, said bottom being joined to said peripheral wall, said storage container being adapted to be inserted into said support, said lid pivoted to said storage container, said lid being displaceable between an opened position and a closed position, said lid being positioned above a portion of said support such that said lid can be moved between said opened and closed positions while said container is inserted in said support, thereby providing access to an interior of the container.

2. The apparatus of claim 1, wherein said support and said storage container tapers from an upper end to a lower end thereof so that said storage container frictionally engages said support when said storage container fully abuts said inner and outer support members of said support.

3. The apparatus of claim 1, further including another outer support member, and wherein said side support members are in the form of longitudinally spaced tabs and said outer support members are in the form of hooks that extend longitudinally towards one another from said side support members.

4. The apparatus of claim 3, wherein said interior panel further includes a bottom support member spaced below said side support members.

5. The apparatus of claim 4, wherein said bottom support member is a lip.

6. The apparatus of claim 1, wherein said storage bin is formed from plastic.

7. The apparatus of claim 1, wherein said lid is pivoted to said storage container by a hinge.

8. The apparatus of claim 7, wherein said hinge is a living hinge which is integral with said storage container and said lid.

9. The apparatus of claim 1, wherein said storage container has a shape complementary to that of said support so that said storage container fits snugly in said support.

10. The apparatus of claim 1, wherein said storage container has a volume in the range of 1/8 to 3/8 cubic feet.

11. The apparatus of claim 1, wherein said storage bin has a handhold attached thereto.

12. The apparatus of claim 1, further including another outer support member, and wherein said side support members are in the form of longitudinally spaced walls which taper from an upper end thereof to a lower end thereof and said outer support members are in the form of flanges which extend longitudinally towards one another from said side support members.

13. The apparatus of claim 12, wherein said storage container is shaped to fit snugly in said support.

14. The apparatus of claim 12, wherein said side walls of said storage container taper from an upper end thereof to a lower end thereof, said storage container being adapted to slide into said support until said outer wall of said storage container abuts said outer support members of said support.

15. The apparatus of claim 1, wherein said inner support member is in the form of a wall, said outer support member is in the form of a wall which is laterally spaced from said inner support member, and said side support members are in the form of walls which extend between said inner and outer support members to triangulate a peripheral wall, and wherein a bottom extends between said inner and outer support members and between said side support members, said bottom cooperates with said peripheral wall to form a pocket for receiving said storage container.

16. The apparatus of claim 1, wherein said lid is provided with a top and a peripheral wall extending down from said top, said top is pivoted to said inner wall of said storage container.

17. The apparatus of claim 1, wherein a forward portion of said peripheral wall is provided with a handle for lifting said lid.

18. The apparatus of claim 1, wherein said inner and outer support members and said side support members are integrally formed.

19. The apparatus of claim 1, wherein said support and said storage bin are molded from plastic.

20. The apparatus of claim 1, wherein said interior panel is connected to a door of a motor vehicle.

* * * * *